United States Patent
Noorlander

[15] 3,659,557
[45] May 2, 1972

[54] TEAT CUP INFLATION

[72] Inventor: Daniel O. Noorlander, 5707 North Bond, Fresno, Calif. 93710

[22] Filed: Mar. 23, 1970

[21] Appl. No.: 21,812

[52] U.S. Cl. ..................................119/14.36, 119/14.47
[51] Int. Cl. ..........................................A01j 05/04
[58] Field of Search ..............119/14.47, 14.48, 14.49, 14.5, 119/14.51, 14.52, 14.53, 14.36

[56] References Cited

UNITED STATES PATENTS

| | | | |
|---|---|---|---|
| 2,340,295 | 2/1944 | Bender | 119/14.36 X |
| 2,997,980 | 8/1961 | Noorlander | 119/14.52 |
| 1,239,923 | 9/1917 | Leitch | 119/14.51 |
| 3,158,136 | 11/1964 | George | 119/14.52 |

Primary Examiner—Hugh R. Chamblee
Attorney—Beveridge & De Grandi

[57] ABSTRACT

A teat cup assembly for an automatic milking machine including an inflation assembly having a retaining diaphragm integrally formed with the cup liner for engaging the teat of a cow to retain the cup against falling off while venting the space between the teat and liner at the end point of milking. The inflation is formed by initially molding the liner and diaphragm from a single mass of resilient elastic material, with the diaphragm having vent means integrally formed thereon to permit the egress of air into the liner at the end point of the milking operation. The configuration of the vent means facilitates molding the liner and diaphragm as a unitary structure.

10 Claims, 3 Drawing Figures

Patented May 2, 1972

3,659,557

INVENTOR
DANIEL O. NOORLANDER

BY Beveridge & DeGrandi

ATTORNEYS.

TEAT CUP INFLATION

This invention relates to vacuum operated automatic milking machines, and more particularly to an improved teat cup inflation employed in such machines and to an improved method of forming the inflation.

As is well known, conventional commercial automatic milking machines employ teat cup assemblies including a hollow rigid outer shell, or cup, adapted to be attached to a pulsating vacuum line, and a resilient, tubular liner positioned within the cup and sealed at each end thereof to receive the cow's teat. The teat is inserted into the upper end of the liner, and a vacuum milk line is attached to the lower end to draw the milk from the cow. In my prior U.S. Pat. No. 3,308,788 there is disclosed a teat cup assembly in which a resilient disk element is mounted on the open top of the teat cup in position to engage the cow's teat and resiliently retain the cup against falling off the teat at the end point of milking, and simultaneously to permit the egress of air into the liner to permit the teat to collapse after the milk has all been drawn from the udder. As explained in my prior patent, a major cause of mastitis in cows results from the teat cup liner preventing the teat from collapsing when all the milk has been drawn therefrom, thereby permitting negative pressure to build up inside the teat cistern. When this happens, the negative pressure will not only cause internal tissue damage, thus enhancing the growth of certain types of bacteria such as staphylococcus, but may also permit a backflow of contaminated milk and air into the cistern. My prior U.S. Pat., identified above, provided a teat cup assembly which avoided this serious defect by permitting the egress of air into the cup liner and down the sides of the teat to permit the teat to collapse as all the milk is drawn from the udder, while simultaneously preventing the teat cup from falling off when the teat collapses.

While my prior teat cup assembly has proven highly successful in the prevention of some types of mastitis, it has been relatively expensive both to manufacture and to maintain because of the number of individual components in the assembly. Accordingly, it is a primary object of the present invention to provide an improved teat cup assembly for use with automatic milking machines.

Another object is to provide an improved inflation including a unitary liner element retaining diaphragm for use in a teat cup assembly of an automatic milking machine.

Another object is to provide an improved method of forming a teat cup inflation.

The foregoing and other objects of the invention are attained in a teat cup assembly according to the present invention in which the teat cup liner and the retaining diaphragm are initially molded, from a single mass of resilient elastic material, in the form of an elongated hollow tubular element. The tubular element includes a body portion adapted to receive the teat of the cow, which body portion terminates at its lower end in a reduced diameter outlet section adapted to be attached to the vacuum milk lines of the milking system and at its upper end in a diaphragm-forming segment having a plurality of longitudinally extending corrugations formed therein. The periphery of the body portion and of the diaphragm-forming portion are substantially equal; however, the corrugations are spaced around the entire periphery of the diaphragm-forming portion so that the mean diameter of this portion is substantially less than that of the body portion. Thus, in its unstressed state, the molded resilient tubular element has a section of reduced diameter at each end. However, by maintaining the periphery of the diaphragm-forming segment substantially equal to the periphery of the body portion, it has been found that a mold core can be withdrawn from this end promptly upon completion of the molding process without damaging the resilient molded tubular element.

After the tubular element has been formed, preferably by injection molding employing a book molding procedure, an expansion ring is inserted in the open end thereof at the junction of the body and diaphragm-forming portions. The outside diameter of the expansion ring is substantially greater than the internal diameter of the body portion whereby the tubular element is stretched outwardly to form a shoulder adapted to be received on a ledge in the rigid cup. By thus stretching its open end, the diaphragm-forming portion is deflected inwardly to a position extending substantially transversally of the longitudinal axis of the body portion. By positioning the expansion ring the proper distance from the open end of the diaphragm-forming portion of the tube, this open end will form a central opening in the diaphragm which is of substantially less diameter than the diameter of the body portion. The corrugations in the diaphragm-forming portion will cause this central opening to be undulated and readily deflected inward to accommodate the teat of a cow. The undulations provide for the egress of air into the liner at the end point of milking to permit the teat to collapse, while at the same time retaining the cup from falling off the collapsed teat.

Other objects and advantages of the invention will become apparent from the following detailed description, taken in conjunction with the drawings, in which.

Figure 1:
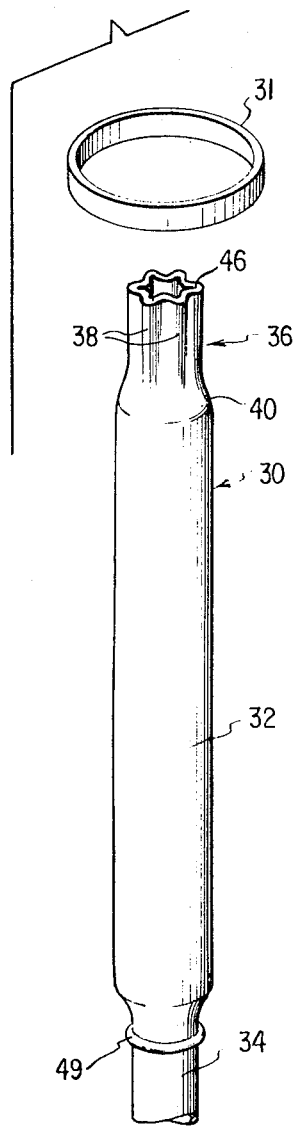
FIG. 1 is an exploded perspective view of the components of a teat cup inflation according to the present invention.

Referring now to the drawings in detail, a teat cup assembly according to the present invention is indicated generally by the reference numerial 10 and includes a rigid elongated cup-shaped outer shell number 12 preferably formed from transparent synthetic resin or plastic material. Shell 12 has an opening 14 in its bottom surface to permit the lower, or outlet end of inflation member 16 to extend therethrough. The top portion of shell 12 terminates adjacent its open end in an outwardly extending ledge or flange 18 and an upwardly extending rim portion 20, with ledge 18 and rim 20 cooperating to define a seat and retaining ring for inflation 16. A nipple 22 is formed on the side of the shell 12 and has an opening 24 extending therethrough to provide fluid communication for connecting a pulsator (not shown) to provide a pulsating vacuum within the space 26 between the wall of the shell 12 and the inflation 16.

Referring particularly to FIG. 1, it is seen that the inflation 16 comprises an elongated tubular liner element 30 which is injection-molded from a single homogenuous mass of resilient elastic material, and an annular metal expansion ring 31. The liner 30 includes an elongated cylindrical body portion 32 for receiving the teat of a cow, a lower outlet portion 34 having a reduced diameter for passing through the opening 14 in cup 12 to be attached to the vacuum milk line of a conventional milking machine (not shown), and a diaphragm-forming portion 36 integrally molded on the top of the body 32. The periphery of the diaphragm-forming portion 36 is preferably substantially equal to that of the body portion 30; however, diaphragm-forming portion 36 has a plurality of axially extending, parallel corrugations 38 formed therein at spaced intervals around its periphery so that the mean diameter of the diaphragm-forming portion is substantially less than that of the body portion 32. Thus, it is seen that liner element 30, in its unstressed state, has a necked-down portion at each end thereof, which condition does not normally lend itself readily to injection molding. However, since the periphery of the diaphragm-forming portion 36 is substantially equal to that of the body portion 32, the corrugations 38 permit this diaphragm-forming portion 36 to expand so that the mold core may be withdrawn upon completion of the injecting molding process.

Figure 2:
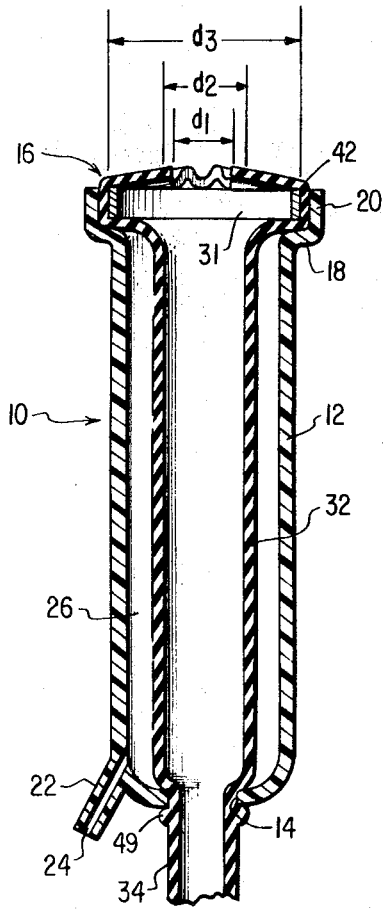
FIG. 2 is an elevation view, in section, of a teat cup assembly employing the improved inflation of the present invention.
Figure 3:
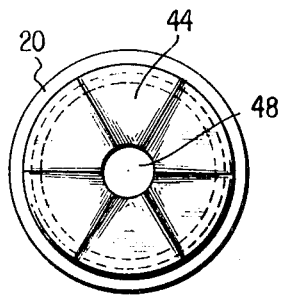
FIG. 3 is a top plan view of the teat cup assembly illustrated in FIG. 2.

Referring now to FIG. 2, it is seen that the expansion ring 31 is inserted into the open top end of liner 30 to a position about adjacent to the junction of the body portion 32 and diaphragm-forming portion 36, which junction area is indicated generally at 40 in FIG. 1. Since the outside diameter of the expansion ring 31 is substantially greater than the diameter of body portion 32 or of the mean diameter of diaphragm-forming portion 36, the liner 30 is expanded substantially in the area of junction 40 to form an enlarged head 42 adapted to seat firmly on the ledge 18 and be resiliently gripped around its outer periphery by the retaining rim 20 to retain the inflation in position within the shell 12. In this position, the outlet portion 34 extends through and is retained in opening 14 by an enlarged retainer ring portion 49 in position to be connected to a vacuum milk line in a manner similar to that shown in my prior U.S. Pat. No. 2,997,980.

By radially expanding the liner 32 at a point spaced from the top open end thereof, the diaphragm-forming portion 36 is deflected inwardly substantially transverse to the longitudinal axis of the liner to form a diaphragm 44 with the open end of the liner forming a central opening 48 in the diaphragm which is concentric with the body portion 32.

Still referring to FIG. 2, it is seen that, by spacing the expansion ring 31 from the open end 46 of the liner 30 a distance which is greater than the difference between the diameter $d-3$ of the expansion ring 31 and the diameter $d-2$ of the body portion 32, then the diameter $d-1$ of the central opening 48 of diaphragm 44 will be less than the diameter of the body 32. The undulations in diaphragm 44, near the central opening 48 therein, readily accommodate the slight compressive force around the inner periphery of the opening 48 so that the diaphragm 44 maintains its generally transverse position relative to the axis of the liner 30 even though the diameter $d-1$ of opening 48 is less than the mean diameter of the unstressed diaphragm-forming segment and substantially less than the diameter $d-2$ of body portion 32. This ability of the corrugations to accommodate compression forces near the central portion of diaphragm 44 makes it possible, by slight movement of the axial position of expansion ring 31, to adjust the diameter $d-1$ of the central opening 48, within reasonable limits, to provide the necessary gripping force on the teat of the cow without materially affecting the ability of the diaphragm to expand to receive any size teat without restricting the flow of blood or milk, and at the same time having the ability to vent the space between the teat and liner to permit the teat to collapse when milk pressure drops at the end point of milking.

As in the case of the assembly shown in my prior U.S. Pat. No. 3,308,788, the teat cup assembly according to the present invention is installed on a cow by inserting the teat through the central opening 48 into the body portion 32 of the liner 30. By providing a central opening 48 which has a diameter that is normally somewhat less than that of a cow's teat, the diaphragm 44 will be deflected inwardly to assume an over-center, substantially frusto-conical configuration expanding the diameter $d-1$ of opening 48 and resiliently engaging the teat in the manner described in my prior patent. The undulations formed by the corrugations 38 around the periphery of opening 48 will readily permit the egress of air into the interior of the lining and around the teat at the end point of milking to permit the teat to collapse. However, the diaphragm will continue to resiliently grip the teat to effectively prevent the cup from falling off after the teat has collapsed. To provide for adequate venting of the liner at the end point of the milking, and to provide a more uniform compression of the inner periphery of the central opening 48, there should be at least four and preferably six corrugations 38 in the diaphragm 44.

From the above, it is seen that a principal feature of my improved teat cup assembly resides in providing an inflation which includes a unitary teat cup liner and retaining diaphragm which effectively combats mastitis by preventing the reduction of pressure below atmospheric within the teat cistern when all the milk has been drawn from the cow's udder. This unitary construction of the diaphragm and the liner greatly simplifies manufacture and maintenance of the teat cups, and therefore results in greater economy to the milk producer. By molding corrugations in the diaphragm-forming portion of the liner, then applying a uniform radical tensile, or stretching, force to its lower end, this portion assumes a position substantially normal to the axis of the liner. Further, the corrugations readily accommodate compressive stresses in the portion of the diaphragm, so formed, thereby making it practical to provide a central opening in the diaphragm having a diameter which is substantially less than the diameter of the body portion of the liner.

While I have disclosed a preferred embodiment of my invention, I wish it understood that I do not intend to be restricted solely thereto, but that I do intend to include all embodiments thereof which would be apparent to one skilled in the art and which come within the spirit and scope of my invention.

I claim:

1. An inflation for use in a teat cup assembly for automatic milking machines employing a vacuum milk line and a vacuum pulsator, said cup assembly including a rigid substantially cylindrical outer shell having a ledge extending around its inner periphery adjacent its upper end defining an inflation seat, the improvement wherein said inflation comprises an elongated hollow cup liner having a body portion adapted to receive the teat of a cow, said body portion terminating at its lower end in an outlet adapted to be attached to the vacuum milk line of a milking machine and at its upper end in a retaining diaphragm extending substantially transverse to said body portion and having a central opening therein coaxial with and having a diameter less than the diameter of said body portion, said body portion and said retaining diaphragm being integrally molded from a single homogeneous mass of resilient elastic material, and vent means integrally formed on said diaphragm for permitting the egress of air into said liner at the end point of milking, said vent means including a plurality of radially extending corrugations formed on said diaphragm whereby the periphery of said central opening in undulated, said cup liner and said diaphragm being initially molded as portions of a unitary coaxial tube with said body portion and the diaphragm portion having substantially equal peripheries, said corrugations extending generally coaxially of said diaphragm portion whereby the mean diameter of said diaphragm portion is substantially less than the diameter of said body portion, and an expansion ring being mounted within said body portion whereby said diaphragm is deflected inwardly substantially transverse to the longitudinal axis of said body portion.

2. The inflation defined in claim 1 wherein said vent means comprises a plurality of radially extending corrugations formed on said diaphragm whereby the periphery of said central opening is undulated.

3. The inflation defined in claim 1 wherein said opening is said lower end has a periphery substantially less than the periphery of said body portion.

4. In a teat cup assembly for an automatic milking machine of the type employing a vacuum milk line and a vacuum pulsator, said cup assembly including a rigid outer cylindrical shell having an enlarged portion at the upper open end thereof defining an inflation seat and retaining ring, and a resilient inflation mounted coaxially within said cup and being retained on said seat by said retaining ring, the improvement wherein said inflation comprises an elongated hollow cup liner member integrally molded from a single homogeneous mass of resilient elastic material, said liner including an open bottom end adapted to be connected to the vacuum milk line of the milking machine and a body portion adapted to receive the teat of a cow, said body portion terminating adjacent its top end in a diaphragm-forming segment having a plurality of axially extending corrugations formed therein, said corrugations being spaced around the periphery of said body whereby the mean diameter of said diaphragm-forming portion is substantially reduced, and an expansion ring having an outer periphery substantially larger than the internal periphery of said body portion positioned in said portion in fixed spaced relation from said top end whereby said diaphragm-forming segment is deflected inward substantially transversely to the longitudinal axis of said body portion to define a retaining diaphragm having an undulated central opening therein defined by the open top end of said body portion, said undulated central opening being of a diameter less than the diameter of said body portion whereby at least a portion of said diaphragm adjacent said central opening is normally maintained under a light compressive force, said retaining diaphragm being adapted to be deflected inwardly of said body portion to engage a cow's teat at said periphery to retain the cup assembly from falling off the teat with said corrugations permitting the egress of air between the teat and said body portion at the end point of milking.

5. The teat cup assembly defined in claim 4 wherein the distance from said open top end to said expansion ring is greater than the difference in the diameter of said expansion ring and said body portion whereby the diameter of said central opening is normally less than the diameter of said body portion, said corrugations permitting said diaphragm to be readily deflected axially inward to expand said central opening to substantially the diameter of said body portion to accommodate the teat of a cow.

6. The teat cup assembly defined in claim 5 wherein the diameter of said bottom end is substantially less than the diameter of said body portion.

7. The teat cup assembly defined in claim 5 wherein there are at least four of said corrugations formed in said diaphragm portion.

8. The teat cup assembly defined in claim 5 wherein there are six of said corrugations in said diaphragm.

9. A method of forming an inflation for use in a teat cup assembly of an automatic milking machine, comprising the steps of molding an elongated tubular member including a substantially cylindrical body portion with an outlet at one end and a plurality of circumferentially spaced corrugations formed in its side walls at the other end thereof, said corrugations extending axially from the open end of said tubular member to define a diaphragm-forming portion at said other end, the periphery of said diaphragm-forming portion being substantially equal to that of said body portion with said corrugations producing a mean diameter of said diaphragm-forming portion which is substantially less than the diameter of said body portion, and installing an annular expansion ring coaxially within said tubular member adjacent the junction thereof with said diaphragm-forming portion, said expansion ring having a diameter substantially greater than the diameter of said body portion whereby said tubular member is radially expanded to form a head thereon to seat said inflation in a rigid teat cup shell and to deform said diaphragm-forming portion into a substantially disk-shaped diaphragm having a central opening therein coaxial with said body portion, said corrugations producing an undulated periphery on said central opening.

10. The method defined in claim 9 further comprising the step of spacing said expansion ring from said other end a distance which is greater than the difference in the diameter of said expansion ring and said body portion whereby said central opening has a diameter less than the diameter of said body portion.

* * * * *